US007141632B2

(12) United States Patent
Vaughan et al.

(10) Patent No.: US 7,141,632 B2
(45) Date of Patent: *Nov. 28, 2006

(54) MIXED METALLOCENE CATALYST SYSTEMS CONTAINING A POOR COMONOMER INCORPORATOR AND A GOOD COMONOMER INCORPORATOR

(75) Inventors: George Alan Vaughan, Houston, TX (US); John F. Szul, Nitro, WV (US); Matthew Gary McKee, Blacksburg, VA (US); James McLeod Farley, League City, TX (US); Ching-Tai Lue, Houston, TX (US); Sun-Chueh Kao, Hillsboro, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/817,555

(22) Filed: Apr. 2, 2004

(65) Prior Publication Data
US 2004/0225088 A1    Nov. 11, 2004

Related U.S. Application Data

(63) Continuation of application No. 10/199,808, filed on Jul. 19, 2002, now Pat. No. 6,828,394.

(60) Provisional application No. 60/306,903, filed on Jul. 19, 2001.

(51) Int. Cl.
| C08F 4/44 | (2006.01) |
| C08F 4/64 | (2006.01) |
| C08F 4/643 | (2006.01) |
| C08F 4/6192 | (2006.01) |
| C08F 4/6392 | (2006.01) |
| C08F 4/6592 | (2006.01) |

(52) U.S. Cl. .................. 526/114; 526/113; 526/118; 526/119; 526/160; 526/126; 526/127; 526/943

(58) Field of Classification Search ............... 526/113, 526/114, 118, 119, 943, 126
See application file for complete search history.

(56) References Cited

U.S. PATENT DOCUMENTS

| 5,359,015 A | 10/1994 | Jejelowo .................. 526/114 |
| 5,382,630 A | 1/1995 | Stehling et al. ............. 525/240 |
| 5,382,631 A | 1/1995 | Stehling et al. ............. 525/240 |
| 5,679,812 A | 10/1997 | Winter et al. ................ 556/7 |
| 5,714,427 A | 2/1998 | Winter et al. .............. 502/117 |
| 5,786,495 A | 7/1998 | Resconi et al. ............. 556/11 |
| 5,886,202 A | 3/1999 | Jung et al. ................. 556/11 |
| 5,929,264 A | 7/1999 | Rohrmann et al. .......... 556/11 |
| 5,990,253 A | 11/1999 | van Beek et al. ........... 526/127 |
| 6,051,728 A | 4/2000 | Resconi et al. ............. 556/53 |
| 6,111,019 A | 8/2000 | Arjunan et al. ............. 525/211 |
| 6,177,377 B1 * | 1/2001 | Chien ....................... 502/113 |
| 6,180,736 B1 | 1/2001 | Muhle et al. ............... 526/160 |
| 6,207,606 B1 | 3/2001 | Lue et al. .................. 502/113 |
| 6,214,469 B1 | 4/2001 | Sukhadia et al. ........... 428/421 |
| 6,339,134 B1 | 1/2002 | Crowther et al. ........... 526/128 |
| 6,388,115 B1 | 5/2002 | Crowther et al. ............ 556/11 |
| 6,410,659 B1 | 6/2002 | Maddox et al. ............. 526/114 |
| 6,489,413 B1 | 12/2002 | Floyd et al. ................ 526/160 |
| 6,545,105 B1 | 4/2003 | Follestad et al. ............ 526/65 |
| 6,642,400 B1 | 11/2003 | Holtcamp et al. ........... 556/11 |
| 6,828,394 B1 * | 12/2004 | Vaughan et al. ............ 526/114 |

FOREIGN PATENT DOCUMENTS

| EP | 0664301 A1 | 7/1995 |
| EP | 0702030 A1 | 3/1996 |
| EP | 0511665 B1 | 7/1998 |
| EP | 0926169 A2 | 6/1999 |
| WO | WO 98/28350 | 7/1998 |
| WO | WO 00/31088 | 6/2000 |
| WO | WO 00/50466 * | 8/2000 |
| WO | WO 03/037938 | 5/2003 |

OTHER PUBLICATIONS

Wang, B. et al., "*Ethylene polymerizations with disiloxane-bridged indenyl and cyclopentadienyl metallocene catalysts*," Macromol. Chem. Phys. 198 3197-3205 (1997).
Löfgren, B., "*New olefin copolymers synthesized by metallocenes*," Recent Res. Devel. in Macromol. Res., 3, 117-131 (1998).
Abstract: He, Dawei et al., "*Metallocene polymerization catalyst for high molecular weight polyethylene and preparation thereof*" retrieved from STN Database accession No. 131:351801 abstract & CN1149060A (Chemical Institute, Chinese Academy of Sciences, Peop. Rep. China) May 7, 1997.

(Continued)

*Primary Examiner*—Roberto Rabago
(74) *Attorney, Agent, or Firm*—Kevin M. Faulkner; Leandro Arechederra

(57) ABSTRACT

The present invention provides polymerization catalyst compounds, catalyst systems including these catalyst compounds, and to their use in the polymerization of ethylene and at least one comonomer. In particular, the invention provides a catalyst system comprising a poor comonomer incorporating catalyst compound and a good comonomer incorporating catalyst compound. Preferably, the low comonomer incorporating catalyst compound is a metallocene containing at least one substituted or unsubstituted fused ring cyclopentadienyl based ligand which is substantially directed to the front of the molecule, contains a long bridging group, or which contains a methyl substitution pattern which correlates to poor comonomer incorporation. The invention also provides methods of selecting the poor comonomer incorporating metallocene to pair with the good comonomer incorporating metallocene to produce polymers that are easy to process into a variety of articles, especially polyethylene based film, having enhanced properties.

12 Claims, 6 Drawing Sheets

OTHER PUBLICATIONS

Herrman, et al., Angew. Chem. 101 (11) 1536 (1989).

Möhring, Petra C., "*Homogeneous Group 4 metallocene Ziegler-Natta catalysts: the influence of cyclopentadienyl-ring substituents,*" Journal of Organometallic Chemistry 479, 1-29 (1994).

Brintzinger, Hans H., "*Stereospecific Olefin Polymerization with Chiral Metallocene Catalysts,*" Angew. Chem. Int. Ed. Engl., 34, 1143-1170 (1995).

Soares, João B.P., "*Mathematical Modelling and Control of Chemical Composition Distribution of Ethylene/α-Olefin Copolymers Made with Single and Combined Metallocene Catalysts,*" Polymer Reaction Engineering 8(3), 241-270 (2000).

Galland, G.B., et al., "*Linear low-density polyethylene synthesis promoted by homogeneous and supported catalysts,*" Polymer International 48, 660-664 (1999).

Wigum, Hanne, et al., "*Structure-Property Transition-State Model for the Copolymerization of Ethene and 1-Hexene with Experimental and Theoretical Applications to Novel Disilylene-Bridged Zirconocenes,*" Journal of Polymer Science, Part A: Polymer Chemistry 41(11), 1622-1631 (2003).

Lehtinen, Christel et al. "*A Comparison of ($\eta$-butCp)$_2$ ZrCi$_2$ and Other Simple Metallocenes with Bridged Et(Ind)$_2$ ZrCl$_2$ and Me$_2$ Si(Ind)$_2$ ZrCl$_2$ Catalysts in Ethene/Propene Copolymerization,*" European Polymer Journal 33(1), 115-120 (1997).

Suhm, J., "*Influence of metallocene structures on ethen copolymerization with 1-butene and 1-octene,*" Journal of Molecular Catalysis A: Chemical 128(1-3) 215-227 (1998).

Bruaseth, Ingvild et al. "*Dual Site Ethene/I-Hexene Copolymerization with MAO Activated (1,2,4-Me$_3$ CP)$_2$ ZrCl$_2$ and (Me$_5$ Cp)$_2$ ZrC$_L$2 Catalysts. Possible Transfer of Polymer Chains between the Sites,*" Marcromolecules 36(9), 3026-3034 (2003).

Schneider, M.J., et al. "*Influence of Indenyl Ligand Substitution Pattern on Metallocene-Catalyzed Ethene Copolymerization with 1-Octene,*" Macromolecules 30, 3164-3168 (1997).

Suhm, J., et al. "*Temperature Dependence of Copolymerization Parameters in Ethene/1-Octene Copolymerization Using Homogeneous rac-Me$_2$ Si(2-MeBenz[e] Ind)$_2$ ZrCl$_2$ /MAO Catalyst,*" Journal of Polymer Science, Part A: Polymer Chemistry 35, 735-740 (1997).

Brintzinger Hans H., "*Stereospecific Olefin Polymerization with Chiral Metallocene Catalysts,*" Angew.Chem. Int. Ed. Engl. 34, 1143-1170 (1995).

Karol, Frederick J., et al., "*Features of Cyclopentadienyl Metal Catalysts for Ethylene Copolymerization in Gas and Liquid Phase*" Metalorganic Catalysts for Synthesis and Polymerization 629-642, (Walter Kaminsky, Ed., Springer 1999).

* cited by examiner

MIXED METALLOCENE CATALYST SYSTEMS CONTAINING A POOR COMONOMER INCORPORATOR AND A GOOD COMONOMER INCORPORATOR

CROSS-REFERENCE TO RELATED APPLICATIONS

The present application is a Continuation Application of, and claims priority to, U.S. Ser. No. 10/199,808 filed Jul. 19, 2002 now U.S. Pat. No. 6,828,394, which claims priority to provisional patent application U.S. Ser. No. 60/306,903 filed on Jul. 19, 2001, both of which are herein incorporated by reference.

FIELD OF THE INVENTION

The present invention relates to polymerization catalyst compounds, catalyst systems including these catalyst compounds, and to their use in the polymerization of ethylene and at least one comonomer. In particular, the invention relates to a catalyst system comprising a poor comonomer incorporating catalyst compound and a good comonomer incorporating catalyst compound. Preferably, the low comonomer incorporating catalyst compound is a metallocene containing at least one substituted or unsubstituted fused ring cyclopentadienyl based ligand which is substantially directed to the front of the molecule, contains a long bridging group, or contains a 1-substituted bisindenyl ligand which has been determined to correlate to poor comonomer incorporation. The invention also relates to methods of selecting the poor comonomer incorporating metallocene to pair with the good comonomer incorporating metallocene, to polymers prepared utilizing the catalyst systems of the invention, and to articles, especially polyethylene based film, having enhanced properties produced therefrom.

BACKGROUND OF THE INVENTION

Metallocene catalyst compounds that incorporate comonomer poorly, typically show very low activity. In addition, polymer molecules having low comonomer content are generally more crystalline and have a high melting temperature, which is disadvantageous in applications such as film where softness or clarity is desired. However, polymers produced by these low incorporators have been shown to be useful in preparing polymer blends. Such blends, for example, include two polymers with each polymer having the same molecular weight, but different comonomer content. Typically these blends have improved mechanical, physical and/or chemical properties and produce articles of manufacture with superior properties. For example, polymer blends prepared with broad bimodal composition distributions consisting of two narrow populations are known to have superior properties such as high tear values in films.

U.S. Pat. No. 5,382,630 to Stehling et al. discloses linear ethylene interpolymer blends made from components that can have the same molecular weight but different comonomer contents, or the same comonomer contents but different molecular weights, or comonomer contents that increase with molecular weight.

U.S. Pat. No. 6,051,728 to Resconi et al. discloses a class of metallocene compounds having two substituted cyclopentadienyl rings bridged by an alkylidene group wherein the groups can be indenyl groups. The metallocenes are characterized by (i) the cyclopentadienyl groups are substituted at the 3-position with a substituent other than hydrogen while the 2-position bears a hydrogen or is part of a condensed benzene ring; (ii) the bridge is a substituted-methylene bridge; and (iii) the cyclopentadienyl groups are identically substituted. These catalyst compositions are utilized in olefin polymerization and particularly in propylene polymerization. However, catalysts with short bridges, such as methylene bridges, particularly those with indenyl or flourenyl ligands, are generally known to have very high comonomer incorporation.

Angew. Chem. 101 (1989) No. 11, 1536 Herrman, Rohrmann et al. discusses four atom bridged bis-indenyl metallocenes.

There is a need in the industry for the ability to identify polymerization catalyst compounds having low comonomer incorporation and enhanced activity to produce polymers and polymer blends with enhanced properties.

In addition, there is a need in the industry for catalyst systems to produce polymers with enhanced properties imparted by catalyst systems including poor comonomer incorporating catalysts to produce polymers, utilizing more than one catalyst in a single reactor.

SUMMARY OF THE INVENTION

The present invention is directed to polymerization catalyst systems which include a good comonomer incorporating catalyst compound and a poor comonomer incorporating metallocene catalyst compound, which contains at least one fused ring cyclopentadienyl based ligand, and to the catalyst systems use in olefin(s) polymerization processes. The poor comonomer incorporating metallocene compound contains one or more fused ring cyclopentadienyl based ligand which may be hydrogenated or substituted, and which may be bridged or unbridged to another ligand.

The invention is also directed to the selection of poor comonomer incorporating catalyst compounds to pair with good comonomer incorporating catalyst compounds to form catalyst systems for olefin(s) polymerization to produce polymers having enhanced properties that are easy to process, and especially to produce polymer films having enhanced properties. The preferred polymerization processes are gas phase or slurry phase processes, and are most preferably gas phase processes, especially where the catalyst system is supported.

In one embodiment, the invention provides for a polymerization process for the polymerizing of ethylene in combination with one or more other olefin(s) comonomers in the presence of a catalyst system comprising a poor comonomer incorporating metallocene catalyst compound and a good comonomer incorporating catalyst compound.

In another embodiment, the catalyst system of the invention including a poor comonomer incorporator and at least one second catalyst compound is utilized to prepare polymers in a single gas phase reactor.

In another embodiment the catalyst system of the invention includes substantially the rac isomer, both the rac and meso isomers, or substantially the meso isomer of the metallocene catalyst compounds, preferably of the poor comonomer incorporating metallocene catalyst compound.

DETAILED DESCRIPTION OF THE INVENTION

Introduction

The polymerization catalyst systems of the invention including a poor comonomer incorporating metallocene catalyst compound and a good comonomer incorporating metallocene catalyst compound. The poor incorporating catalyst compounds contain at least one substituted or unsubstituted fused ring cyclopentadienyl based ligand. Preferably, the catalyst systems of the invention are utilized in the polymerization of ethylene, and at least one comonomer.

For the purposes of this patent specification, the term "catalyst" refers to a metal compound, which when combined with an activator, polymerizes olefins. The term "activator" is used interchangeably with the term "cocatalyst", and the term "catalyst system" refers to the combination of catalyst, activator, and optionally a support material. The term "poor incorporator" is defined further herein, and refers to a polymerization catalyst compound, preferably a metallocene polymerization catalyst compound, which produces a higher density polyethylene, under similar processing parameters, when compared to bis(indenyl)zirconium dichloride. The term "good incorporator" as used herein, is a relative term meaning incorporating more comonomer than the "poor incorporator" with which it is paired.

The process of the invention teaches a method to obtain polymers with bimodal composition distributions and enhanced properties in a single reactor utilizing a catalyst system including both a good comonomer incorporating catalyst compound and a poor comonomer incorporating catalyst compound. A larger difference in the comonomer incorporation ability of the good incorporator and the poor incorporator will lead to a more broadly separated bimodal polymer composition which will in turn generally lead to more enhanced properties in the polymer.

The degree of comonomer incorporation ability in a polymerization process is often judged by the mole ratio of comonomer concentration to ethylene concentration required in the polymerization medium to achieve a certain polymer density or average comonomer content. In a gas phase polymerization process this would be the derived from the concentrations of comonomer and monomer in the gas phase. In a slurry phase polymerization process this would be the derived from the concentrations of comonomer and monomer in the liquid diluent phase. In a homogeneous solution phase polymerization process this would be the derived from the concentrations of comonomer and monomer in the solution phase.

Figure 2:
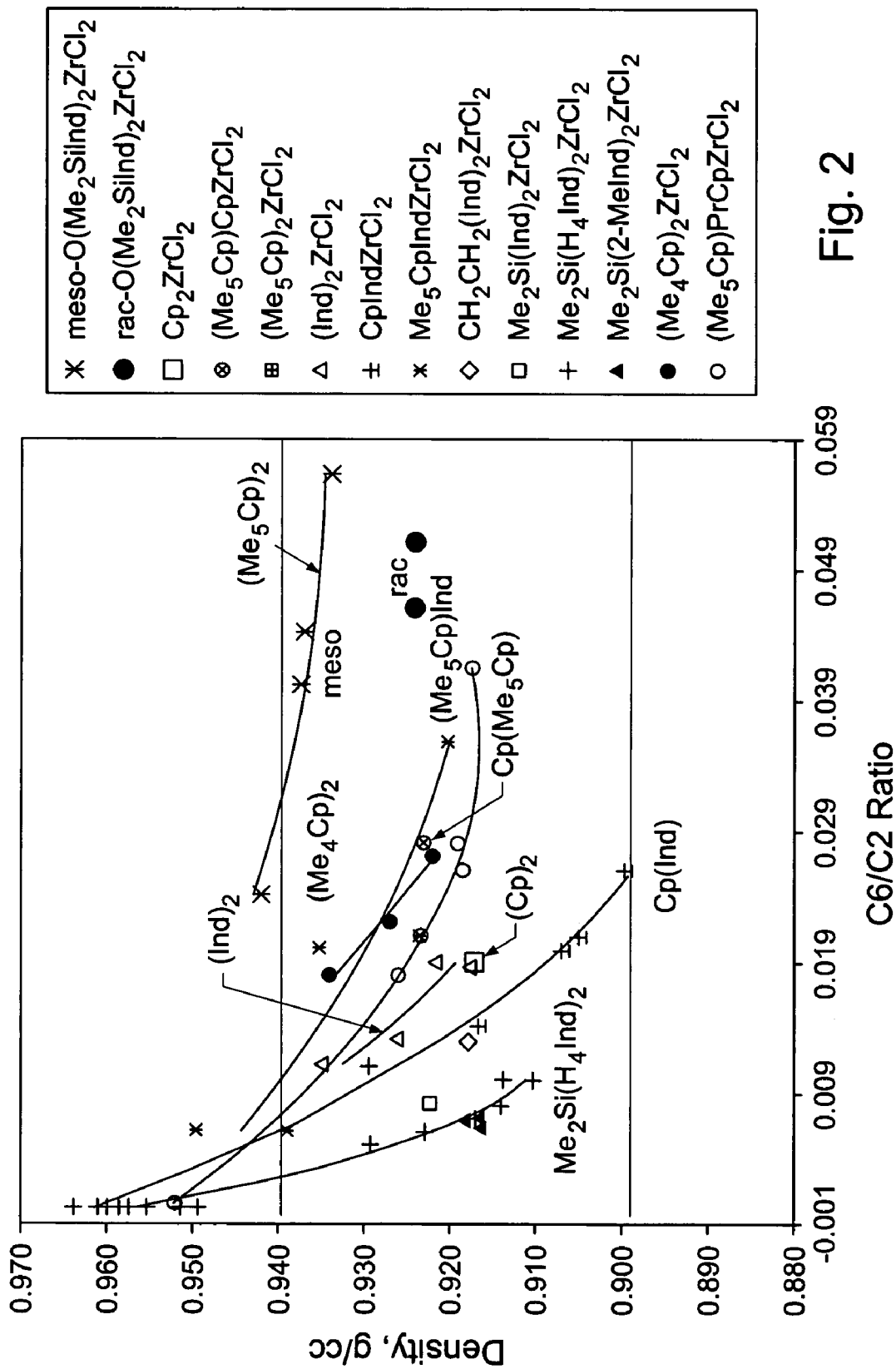
FIG. 2 is a plot of Comonomer (hexene) to Ethylene Mole Ratio vs. Density of Polyethylene Produced for several metallocene catalyst compounds.

For example, FIG. 2, Table 1 and Table 2 describe a gas phase process using hexene comonomer in which a catalyst system comprising (Ind)$_2$ZrCl$_2$ requires comonomer to monomer mole ratio of about 0.019 to produce a polymer of 0.920 g/cc density. A catalyst comprising poor incorporator rac-O(Me2SiInd)2ZrCl2 requires a comonomer to monomer mole ratio of about 0.050 to make a similar density polymer. The required comonomer to monomer mole ratio for the poor incorporator to make the target 0.920 g/cc density polymer is greater than twice the mole ratio of the good incorporator.

In the catalysts of the invention the comonomer to monomer mole ratio required for the poor comonomer component of the catalyst to make 0.920 g/cc density polymer will preferably be at least twice the value of comonomer to monomer mole ratio required for the good incorporator to make 0.920 g/cc density polymer, more preferably three times the value, even more preferably four times the value, and even more preferably five times the value.

Poor Comonomer Incorporating Metallocene Catalyst Compound

The catalyst system of the invention includes a poor comonomer incorporating metallocene catalyst compounds. The low incorporator includes half and full sandwich compounds having at least one, preferably two, fused ring cyclopentadienyl based ligands, and at least one leaving group bonded to a metal atom. Fused ring cyclopentadienyl based ligands are those ligands including a substituted or unsubstituted cyclopentadienyl group which shares a pair of carbon atoms with another cyclic or aromatic structure.

The ring of the fused ring cyclopentadienyl based ligand is typically composed of atoms selected from Groups 13 to 16 atoms of the Periodic Table of Elements, preferably the atoms are selected from carbon, nitrogen, oxygen, silicon, sulfur, phosphorous, boron and aluminum or a combination thereof. Most preferably the ring of the fused ring cyclopentadienyl based ligand is composed of carbon atoms. Cyclopentadienyl based ligands also include other similar functioning ligand structures such as a pentadiene, a cyclooctatetraendiyl or an imide ligand.

The metal atom is preferably selected from Groups 3 through 15 and the lanthanide or actinide series of the Periodic Table of Elements. Preferably the metal is a transition metal from Groups 4 through 12, more preferably from Groups 4, 5 and 6, and most preferably the metal is from Group 4.

A "leaving group" for the purposes of this patent specification and appended claims is any ligand that can be abstracted from the metallocene catalyst compounds of the invention to form the metallocene catalyst cation capable of polymerizing one or more olefin(s).

In one embodiment, the poor comonomer incorporating metallocene catalyst compound are represented by the Formula (I):

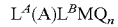    Formula (I)

where M is a Group 3 to 12 metal or an atom selected from the lanthanide or actinide series of the Periodic Table of Elements, preferably M is a Group 4, 5 or 6 transition metal, more preferably M is a Group 4 transition metal, more preferably M is zirconium, hafnium or titanium and most preferably M is zirconium.

$L^A$ and $L^B$ are independently bulky ligands, bonded to M, where at least one of $L^A$ or $L^B$ is a fused ring cyclopentadienyl based bulky ligand. Bulky ligands are defined herein as open, acyclic, or fused ring(s) or ring system(s) such as unsubstituted or substituted, cyclopentadienyl ligands or cyclopentadienyl based ligands, heteroatom substituted and/or heteroatom containing ligands.

Non-limiting examples of bulky ligands include cyclopentadienyl ligands, indenyl ligands, benzindenyl ligands, fluorenyl ligands, octahydrofluorenyl ligands, cyclooctatetraendiyl ligands, azenyl ligands, azulene ligands, pentalene ligands, phosphoyl ligands, pyrrolyl ligands, pyrozolyl ligands, carbazolyl ligands, borabenzene ligands and the like, including hydrogenated versions thereof, for example tetrahydroindenyl ligands.

Non-limiting examples of a fused ring cyclopentadienyl based ligand include indenyl ligands, benzindenyl ligands, fluorenyl ligands, octahydrofluorenyl ligands, cyclooctatetraendiyl ligands, azenyl ligands, azulene ligands, and the like, including hydrogenated versions thereof, for example tetrahydroindenyl ligands.

In one embodiment, $L^A$ and $L^B$ may be any other ligand structure capable of η-bonding to M, preferably $η^3$-bonding to M, and most preferably $η^5$-bonding to M wherein at least one of $L^A$ or $L^B$ is a fused ring cyclopentadienyl based ligand. In another embodiment, both $L^A$ and $L^B$ are fused ring cyclopentadienyl based ligands which may be the same or different.

In one embodiment, at least one of $L^A$ or $L^B$ and preferably both $L^A$ and $L^B$ are substituted or unsubstituted indenyl radicals.

In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazamacrocycles.

Independently, each $L^A$ and $L^B$, as described above, may be unsubstituted or substituted with a combination of substituent groups R. Non-limiting examples of substituent R groups include one or more from the group selected from hydrogen, linear or branched alkyl or alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic alkylene radicals, or combination thereof.

Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other substituents R include hydrocarbyl radicals such as fluoromethyl, fluoroethyl, difluoroethyl, iodopropyl, bromohexyl, chlorobenzyl; hydrocarbyl substituted organometalloid radicals including trimethylsilyl, trimethylgermyl, methyldiethylsilyl and the like; halocarbyl-substituted organometalloid radicals including tris(trifluoromethyl)-silyl, methyl-bis(difluoromethyl)silyl, bromomethyldimethylgermyl and the like; disubstitiuted boron radicals including dimethylboron for example; disubstituted pnictogen radicals including dimethylamine, dimethylphosphine, diphenylamine, methylphenylphosphine; and chalcogen radicals including methoxy, ethoxy, propoxy, phenoxy, methylsulfide and ethylsulfide.

Other substituents R include the atoms carbon, silicon, boron, aluminum, nitrogen, phosphorous, oxygen, tin, sulfur, germanium and the like. Substituent R groups also include olefins such as but not limited to olefinically unsaturated substituents including vinyl-terminated ligands, for example but-3-enyl, prop-2-enyl, hex-5-enyl and the like. Also, at least two R groups, preferably two adjacent R groups, may be joined to form a ring structure having from 3 to 30 atoms selected from carbon, nitrogen, oxygen, phosphorous, silicon, germanium, aluminum, boron or a combination thereof. Also, a substituent group R such as 1-butanyl may form a carbon sigma bond to the metal M.

Each Q is independently a leaving group bonded to M. In one embodiment, Q is a monoanionic labile ligand having a sigma-bond to M. Non-limiting examples of Q ligands include weak bases such as amines, phosphines, dienes, and ethers; monoanionic bases such as carboxylates, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methoxy, ethoxy, propoxy, phenoxy, bis(N-methylanilide), dimethylamide, dimethylphosphide radicals and the like.

Depending on the oxidation state of the M, the value for n is 0, 1 or 2 such that formula (I) above represents a neutral metallocene catalyst compound.

A is an optional group. When A is present it is a bridging group bonded to $L^A$ and $L^B$. Non-limiting examples of bridging group A include groups containing at least one Group 13 to 16 atom(s), often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom. More preferably bridging group A contains at least one, preferably 2 silicon atom(s) or at least one carbon atom. In another embodiment, A contains, two, preferably more than two, preferably 3 to 4 and most preferably 3 Group 13 to 16 atoms.

In another embodiment, the bridging group A contains substituent groups R as defined above including halogens and iron. Bridging group A may be represented by $R'_2C$, $R'_2Si$, $R'_2Si\ R'_2Si$, $R'_2Ge$, R'P, $R'_2Si—NR'—R'_2Si$ or $R'_2Si—O—R'_2Si$ where each R' is independently, a radical group which is hydride, hydrocarbyl, preferably alkyl having from 1 to 8 carbon atoms, substituted hydrocarbyl, halocarbyl, substituted halocarbyl, hydrocarbyl-substituted organometalloid, halocarbyl-substituted organometalloid, substituted boron, substituted pnictogen, substituted chalcogen, or halogen or two or more R' may be joined to form a ring or ring system. In another embodiment, the bridged metallocene catalyst compounds of Formula (I) may have two or more bridging groups A.

In another embodiment, the poor comonomer incorporating metallocene catalyst compound is represented by Formula (II):

$$L^C AJMQ_n \qquad \text{Formula (II)}$$

where M is a Group 3 to 16 metal atom or a metal selected from the Group of actinides and lanthanides of the Periodic Table of the Elements, preferably M is a Group 4 to 12 transition metal, and more preferably M is a Group 4, 5 or 6 transition metal, and most preferably M is a Group 4 transition metal in any oxidation state. Most preferably M is zirconium or hafnium.

$L^C$ is bonded to M and is a fused ring cyclopentadienyl based bulky ligand as defined above, which may be substituted or unsubstituted by R as defined above.

J is a heteroatom ancillary ligand bonded to M. J contains an element with a coordination number of three from Group 15 or an element with a coordination number of two from Group 16 of the Periodic Table of the Elements. Preferably J contains a nitrogen, phosphorus, oxygen or sulfur atom with nitrogen being most preferred.

A is defined as above and is a bridging group bonded to $L^C$ and J.

Q is a univalent anionic ligand; and n is the integer 0, 1 or 2.

In Formula (II) above, $L^C$, A and J form a fused ring system. In an embodiment, $L^C$ of Formula (II) is as defined as $L^A$ above. In another embodiment, A, M and Q of Formula (II) are as defined above in Formula (I).

Figure 1:
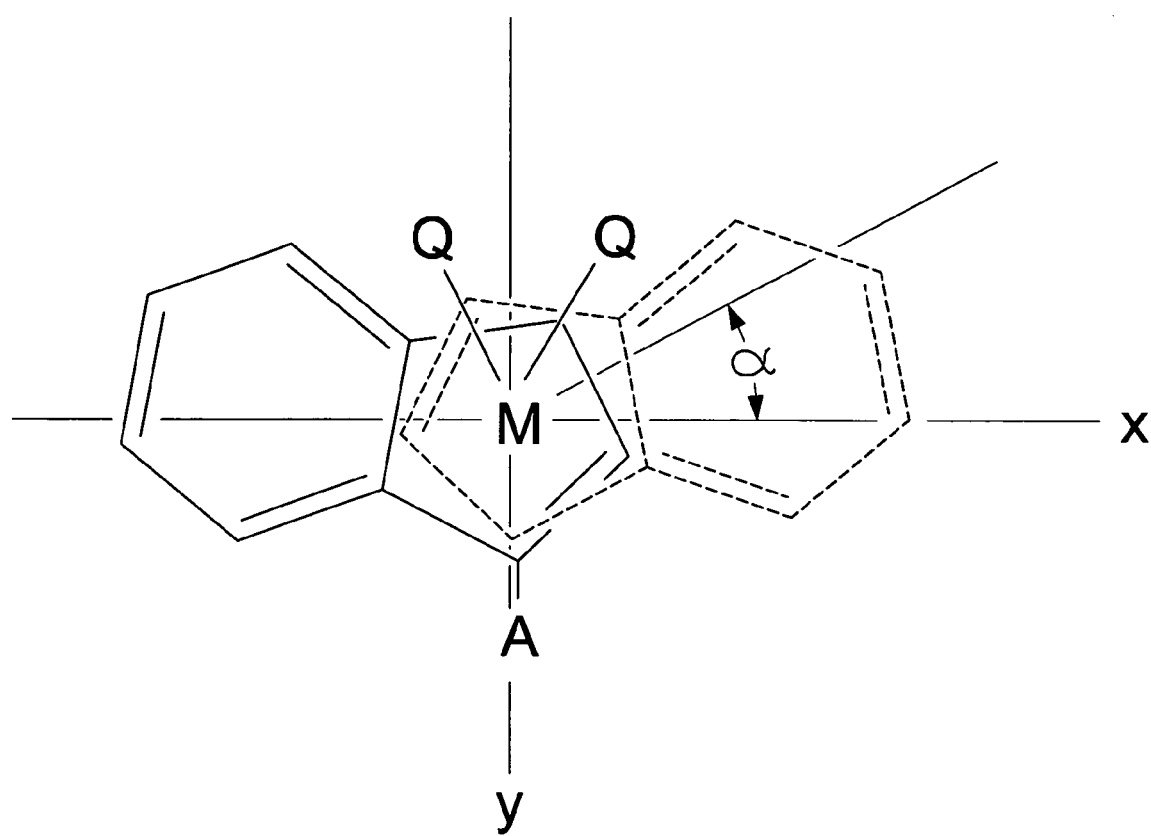
FIG. 1 is a top view of a metallocene showing an x axis placed over the metal atom M between leaving groups Q and bridging group A, a y axis placed over the metal atom M and bisecting leaving groups Q, and angle α defined by the bulky ligand centroids and the metal atom.

In another embodiment the invention provides for a poor comonomer incorporating metallocene catalyst where the metallocene structure includes at least one fused ring cyclopentadienyl based ligand, preferably two, which are substantially directed to the front of the molecule as defined below. The ligands may be directed to the front of the molecule by bridging group A or by substituent group(s). Referring to FIG. 1, which is a top view of one embodiment of a poor comonomer incorporating metallocene of the present invention where metal M is in the plane of the page, a first ligand, here indenyl ligands, are present above (dashed lines) and below (solid lines) the plane of the page. The y axis passes through the metal atom M, lies in the plane of the page, and bisects leaving groups Q. The x axis passes through the metal atom M, lies in the plane of the page and intersects the y axis at a 90° angle. The front of the molecule is defined as towards leaving groups Q. Although bridging group A is present in FIG. 1, it is understood that bridging group A is optional and may or may not present. The ligands, which are represented by indenyl groups in FIG. 1, are directed to the front of the molecule at angle α. Angle α is defined as the angle between the x axis and r where r is the projection into the plane of the page of a line drawn between the centroid of the ring bonded to the metal, here a cyclopentadienyl ring, and the centroid of the fused ring, here a benzyl ring bonded to the cyclopentadienyl ring.

It is understood that if there are two fused cyclopentadienyl based ligands, referring again to FIG. 1, the angle α for the fused ring above the plane of the page may or may not be the same angle α for the fused ring below the plane of the page.

Angle α may be determined from X-ray crystallography and/or calculated from molecular modeling techniques, as is known in the art. In one embodiment, still referring to FIG. 1, α is greater than 30°, preferably greater than 45°, preferably greater than 60°, preferably between 30° and less than 90° and more preferably about 80° to about 90°.

In another embodiment two fused ring cyclopentadienyl based ligands are present and are bridged by at least 3 atoms selected from Groups 13 to 16 of the Periodic Table of the Elements, wherein the angle α of the first ligand is about 80 to about 90° and wherein angle α of the second ligand is greater that 15°.

In another embodiment the invention provides for a poor comonomer incorporating metallocene catalyst where the metallocene structure includes at least one fused ring cyclopentadienyl based ligand bridged to another cyclopentadienyl ligand, as shown above in Formula I, where the bridge A is a long bridge defined as a bridge containing 2 or more, preferably 3 or more atoms. Preferably, a long bridge A includes oxygen silicon and carbon atoms, more preferably, long bridge A includes an Si—O—Si group where the silicon is substituted with an R group as defined above, preferably where R is an alkyl or a nitrogen containing group. Long bridge A may also included Si—N—Si where the nitrogen and the silicon atoms are substituted, preferably with R groups as defined above, more preferably where R is an alkyl. Non-limiting examples of a suitable long bridged low incorporating metallocenes includes $O(Me_2SiInd)_2ZrCl_2$, $O(Me_2SiFluorenyl)_2ZrCl_2$, $O(Me_2SiInd)_2HfCl_2$ $O(Me_2Si[Me_3Cp])_2ZrCl_2$, $O(Ph_2SiInd)_2ZrCl_2$, $RN(Me_2SiInd)_2ZrCl_2$, and $O(Me_2Si[Me_3Cp])(Me_2SiInd)ZrCl_2$. Preferably, these low incorporators are present in the rac or meso forms or a combination thereof. More preferably they are present as substantially the meso isomer. While not wishing to be limited by theory, the inventors believe that X-ray crystal structures show that long bridges swing around toward the front of the metallocene creating steric hinderance, and that in the case of meso —$O(Me_2SiInd)_2ZrCl_2$, for example, both of the indenyl rings are pointed to the front of the molecule making it further crowded. These steric features therefore, should disfavor approach of bulky alpha-olefins, such as an alpha-olefin having 3 or more carbon atoms, preferably greater than 3, more preferably greater than 4, and even more preferably greater than 5 carbon atoms, to the metal center reducing their incorporation.

Referring again to FIG. 1, the long bridging group A provides for poor comonomer incorporating metallocene. In one embodiment two fused ring cyclopentadienyl based ligand are present and are bridged by at least 3 atoms selected from Groups 13 to 16 of the Periodic Table of the Elements, wherein the angle α of the first ligand is about 80 to about 90° and wherein angle α of the second ligand is negative.

In one embodiment, for purposes of the present application, a poor comonomer incorporator is defined herein as a polymerization catalyst which produces a higher density polyethylene than bis indenyl zirconium dichloride $(Ind)_2ZrCl_2$ when run under similar process conditions. For example, referring to FIG. 2 and Table 1, $(Ind)_2ZrCl_2$, produces a 0.920 density polyethylene at a hexene/ethylene mole ratio of 0.019. By comparison, (pentamethylcyclopentadienyl) (indenyl)zirconium dichloride requires a hexene/ethylene mole ratio of 0.036 to produce a 0.920 density polyethylene and is therefore defined herein as a low comonomer incorporator. Conversely, dimethylsilylene bis (4,5,6,7-tetrahydroindenyl)zirconium dichloride requires a hexene/ethylene mole ratio of 0.007 to produce a 0.917 density polyethylene and is therefore defined herein as a good incorporator.

In another embodiment, a poor incorporator is defined herein as a polymerization catalyst, which when run under process conditions wherein $(Ind)_2ZrCl_2$ would produce a 0.920 density polyethylene, produces a polymer with a density greater than 0.920, preferably greater than 0.930, more preferably greater than 0.935, more preferably greater than 0.940, more preferably greater than 0.945 and even more preferably greater than 0.950. In another embodiment the invention provides for a poor comonomer incorporating metallocene catalyst where the metallocene structure includes at least one, preferably two fused ring cyclopentadienyl based ligand, preferably an indenyl based ligand, and most preferably contains two indenyl based ligand substituted to control comonomer incorporation. It has been determined that 1-substituted bisindenylzirconium dichloride compounds are much poorer comonomer incorporators in ethylene polymerization reactions compared to 2 dichloride compounds and other unbridged metallocenes. While substituents in the 4, 5, 6 and 7 position may affect activity, it has been determined that substituents present in the 1-position reduce comonomer incorporation. Suitable substituents in the 1-position which provide for poor comonomer incorporation include alkyl groups such as methyl, ethyl and propyl groups. For example, bis(1-methylindenyl)zirconium dichloride, (1-MeInd)$_2$ZrCl$_2$, supported on silica (Davison 948, 0.35 wt % Zr, 120:1 moles MAO: moles (1-MeInd)$_2$ZrCl$_2$) typically requires a hexene to ethylene mole ratio of 0.044 in the gas phase to make a 1.62 MI, 0.9195 g/cc polymer in a gas phase reactor. Similarly, bis(1-propylindenyl)zirconium dichloride, (1-PrInd)$_2$ZrCl$_2$ typically requires a hexene to ethylene mole ratio of 0.039 to make a 1.68MI, 0.9242D polymer. In contrast, bis(2-methylindenyl)zirconium dichloride, (2-MeInd)$_2$ZrCl$_2$, only requires a hexene to ethylene mole ratio of 0.015 to make 0.47MI, 0.9247 g/cc polymer. Bis(2-propylindenyl)zirconium dichloride, (2-PrInd)$_2$ZrCl$_2$, also typically only requires a hexene to ethylene mole ratio of 0.014 to make a 4.65MI, 0.9275 g/cc polymer.

Bis(propylcyclopentadienyl)zirconium dichloride, (PrCp)$_2$ZrCl$_2$, also typically only requires a hexene to ethylene mole ratio of 0.016 to make a 4.38MI, 0.914 g/cc polymer, and bis(1,3-methylbutylcyclopentadienyl)zirconium dichloride, (1,3-MeBuCp)$_2$ZrCl$_2$, also only requires a hexene to ethylene mole ratio of 0.014 to make a 1.06MI, 0.9173 g/cc polymer.

Good Comonomer Incorporating Catalyst Compound

The catalyst system of the invention includes a good comonomer incorporating catalyst compound paired with the poor comonomer incorporating metallocene catalyst compound described above. By "good incorporator" it is meant that the catalyst compound incorporates more comonomer than the "poor incorporator" with which it is paired.

In one embodiment, the good comonomer incorporating catalyst compound is represented by Formula (III):

$$L^A L^B MQ_n \qquad (III)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium.

$L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (see WO 99/40125, incorporated herein by reference), pyrrolyl ligands, pyrozolyl ligands, carbazolyl ligands, borabenzene ligands and the like, including hydrogenated versions thereof, for example tetrahydroindenyl ligands. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of Formula (III) only one of either L or L is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted pnictogen radicals including dimethylarnine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1 or 2 such that Formula (III) above represents a neutral bulky ligand metallocene-type catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In one embodiment, the good comonomer incorporating catalyst compound include those of Formula (III) where $L^A$ and $L^B$ are bridged to each other by at least one bridging group, A, as represented by Formula (IV):

$$L^A A L^B MQ_n \qquad \text{Formula (IV)}$$

These bridged compounds represented by Formula (IV) are known as bridged metallocene catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si\ R'_2Si$, $R'_2Ge$, $R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene-type catalyst compounds of Formula (IV) have two or more bridging groups A (EP 664 301 B1).

In one embodiment, the good comonomer incorporating catalyst compounds are those where the R substituents on the bulky ligands $L^A$ and $L^B$ of Formulas (III) and (IV) are substituted with the same or different number of substituents on each of the bulky ligands. In another embodiment, the bulky ligands $L^A$ and $L^B$ of Formulae (III) and (IV) are different from each other.

Other metallocene catalyst compounds and catalyst systems useful as the good comonomer incorporator of the catalyst system of the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In one embodiment, the good comonomer incorporating catalysts compounds useful in the invention include bridged heteroatom, mono-bulky ligand metallocene-type compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055,438, 5,198,401, 5,227,440 and 5,264,405 and European publication EP-A-0 420 436, all of which are herein fully incorporated by reference.

In this embodiment, the bulky ligand metallocene-type catalyst compound is represented by the formula:

(V)

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to M and J; J is a heteroatom ancillary ligand; and A is a bridging group; Q is a univalent anionic ligand; and n is the integer 0,1 or 2. In formula (V) above, $L^C$, A and J form a fused ring system. In an embodiment, $L^C$ of formula (V) is as defined above for $L^A$, A, M and Q of Formula (V) are as defined above in Formula (III).

In Formula (V) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In an embodiment of the invention, the good comonomer incorporating catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene-type catalyst compounds are described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In one embodiment, good comonomer incorporating catalyst compounds are those complexes known as transition metal catalysts based on bidentate ligands containing pyridine or quinoline moieties, such as those described in U.S. application Ser. No. 09/103,620 filed Jun. 23, 1998 now U.S. Pat. No. 6,103,657, which is herein incorporated by reference. In another embodiment, the bulky ligand metallocene-type catalyst compounds are those described in PCT publications WO 99/01481 and WO 98/42664, which are fully incorporated herein by reference.

In another embodiment, the good comonomer incorporating catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In another embodiment, the other metal compound or second metal compound is the bulky ligand metallocene-type catalyst compound is represented by Formula (VI):

$L^D MQ_2(YZ)X_n$ (VI)

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a ligand, preferably a unicharged polydentate ligand; A or Q is a univalent anionic ligand also bonded to M; X is a univalent anionic group when n is 2 or X is a divalent anionic group when n is 1; n is 1 or 2.

In Formula (VI), L, M and Q are as defined above for Formula (III). Preferably Q is selected from the group consisting of —O—, —NR—, —$CR_2$— and —S—; Y is either C or S; Z is selected from the group consisting of —OR, —$NR_2$, —$CR_3$, —SR, —$SiR_3$, —$PR_2$, —H, and substituted or unsubstituted aryl groups, with the proviso that when Q is —NR— then Z is selected from one of the group consisting of —OR, —$NR_2$, —SR, —$SiR_3$, —$PR_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In one embodiment, the poor comonomer incorporator and the good comonomer incorporator are combined in molar ratios of 10:1 to 1:10, preferably molar ratios of 10:1, preferably 7:1, more preferably 5:1, and more preferably 3:1. In another embodiment, the poor comonomer is present in a higher molar ratio than the good comonomer incorporator.

Activators and Activation

The good comonomer incorporating and the poor comonomer incorporating metallocene polymerization catalyst compounds, described above, are typically activated in various ways to yield compounds having a vacant coordination site that will coordinate, insert, and polymerize olefin(s). For the purposes of this patent specification and appended claims, the term "activator" is defined to be any compound which can activate any one of the catalyst compounds described above by converting the neutral catalyst compound to a catalytically active catalyst compound cation. Non-limiting activators, for example, include alumoxanes, aluminum alkyls and ionizing activators, which may be neutral or ionic.

In one embodiment, alumoxanes activators are utilized as an activator in the catalyst composition of the invention. Alumoxanes are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage.

Aluminum alkyl or organoaluminum compounds which may be utilized as activators include trimethylaluminum, triethylaluminum, triisobutylaluminum, tri-n-hexylaluminum, tri-n-octylaluminum and the like.

It is also within the scope of this invention to use an ionizing or stoichiometric activator, neutral or ionic, such as tri (n-butyl) ammonium tetrakis (pentafluorophenyl) boron, a trisperfluorophenyl boron metalloid precursor or a trisperfluoronapthyl boron metalloid precursor, polyhalogenated heteroborane anions (WO 98/43983), boric acid (U.S. Pat. No. 5,942,459) or combination thereof. It is also within the scope of this invention to use neutral or ionic activators alone or in combination with alumoxane or modified alumoxane activators.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124, all of which are herein fully incorporated by reference.

In a preferred embodiment, the stoichiometric activators include a cation and an anion component, and may be represented by the following formula:

$$(L-H)_d^+(A^{d-}) \quad \quad (X)$$

wherein L is an neutral Lewis base;
H is hydrogen;
$(L-H)^+$ is a Bronsted acid
$A^{d-}$ is a non-coordinating anion having the charge d−
d is an integer from 1 to 3.

The cation component, $(L-H)_d^+$ may include Bronsted acids such as protons or protonated Lewis bases or reducible Lewis acids capable of protonating or abstracting a moiety, such as an akyl or aryl, from the bulky ligand metallocene or Group 15 containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers and tetrahydrothiophene and mixtures thereof. The activating cation $(L-H)_d^+$ may also be an abstracting moiety such as silver, carboniums, tropylium, carbeniums, ferroceniums and mixtures, preferably carboniums and ferroceniums. Most preferably $(L-H)_d^+$ is triphenyl carbonium.

The anion component $A^{d-}$ include those having the formula $[M^{k+}Q_n]^{d-}$ wherein k is an integer from 1 to 3; n is an integer from 2–6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

In one embodiment, the ionic stoichiometric activator $(L-H)_d^+(A^{d-})$ is N,N-dimethylanilinium tetra(perfluorophenyl)borate or triphenylcarbenium tetra(perfluorophenyl)borate.

In one embodiment, an activation method using ionizing ionic compounds not containing an active proton but capable of producing a bulky ligand metallocene catalyst cation and their non-coordinating anion are also contemplated, and are described in EP-A-0 426 637, EP-A-0 573 403 and U.S. Pat. No. 5,387,568, which are all herein incorporated by reference.

Method for Supporting

The good comonomer incorporating and the poor comonomer incorporating metallocene polymerization catalyst compounds described above may be combined with one or more support materials or carriers using one of the support methods well known in the art or as described below. In the preferred embodiment, the method of the invention uses a polymerization catalyst in a supported form, for example deposited on, bonded to, contacted with, or incorporated within, adsorbed or absorbed in, or on, a support or carrier.

The terms "support" or "carrier" are used interchangeably and are any support material, preferably a porous support material, for example, talc, inorganic oxides and inorganic chlorides. Other carriers include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The preferred carriers are inorganic oxides that include those Group 2, 3, 4, 5, 13 or 14 metal oxides. The preferred supports include silica, alumina, silica-alumina, magnesium chloride, and mixtures thereof. Other useful supports include magnesia, titania, zirconia, montmorillonite (EP-B1 0 511 665), zeolites, and the like. Also, combinations of these support materials may be used, for example, silica-chromium, silica-alumina, silica-titania and the like.

It is preferred that the carrier, most preferably an inorganic oxide, has a surface area in the range of from about 10 to about 700 $m^2/g$, pore volume in the range of from about 0.1 to about 4.0 cc/g and average particle size in the range of from about 5 to about 500 µm. More preferably, the surface area of the carrier is in the range of from about 50 to about 500 $m^2/g$, pore volume of from about 0.5 to about 3.5 cc/g and average particle size of from about 10 to about 200 µm. Most preferably the surface area of the carrier is in the range is from about 100 to about 400 $m^2/g$, pore volume from about 0.8 to about 3.0 cc/g and average particle size is from about 5 to about 100 µm. The average pore size of the carrier of the invention typically has pore size in the range of from 10 to 1000 Å, preferably 50 to about 500 Å, and most preferably 75 to about 350 Å.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332–334 (March, 1956).

When the mixed catalyst systems of the invention are supported together on the same support using conventional deposition methods, such as activation in toluene, contacting with the support, and solvent removal, catalyst interaction may occur. For example, it may often be the case that the poorer comonomer incorporator will be enhanced in productivity relative to the better incorporator, resulting in less bimodal distribution of the composition distribution and less or no enhancement of the polymer properties relative to the polymers produced by the single catalyst components alone. To achieve the enhanced polymer properties from the catalyst system of the invention, the composition distribution is measured and the catalyst system modified to produce strongly bimodal distributions such that the largest high density and low density populations differ in density by at least 0.030 $g/cm^3$ and each population comprises at least 25% of the composition. It is therefore important to select the two or more catalyst components whose comonomer response curves, FIG. 2, are well separated, and to activate, support, and delivery to the polymerization in such a way as to produce the desired bimodality. The data plotted and curves utilized in FIG. 2 appear in Tables 1 and 2 respectively. From Table 1 it can be shown that in gas phase ethylene polymerization $(Me_5Cp)IndZrCl_2$ (Ind=indenyl) shows moderate comonomer and good activity, meso-O $(Me_2SiInd)_2ZrCl_2$ (Ind=indenyl) poor comonomer and good activity, rac-O$(Me_2SiInd)_2ZrCl_2$ (Ind=indenyl) shows poorer comonomer and good activity, and $(Me_5Cp)_2ZrCl_2$ shows poorest comonomer and bad activity.

Analyzing the composition and increasing the relative loadings of one component can be used to adjust the ratio of polymer populations. Increasing the total Al/Zr mole ratio can be used to adjust the ratio of polymer population. Increasing the comonomer/ethylene mole ratio in the process can be used to increase the difference in density of the two or more populations.

In a most preferred embodiment, the polymerization catalysts utilized are introduced onto a support by slurrying a presupported activator in oil, a hydrocarbon such as pentane, solvent, or non-solvent, then adding the catalyst as a solid while stirring. Preferably, the catalysts are finely divided solids. Although the catalysts are typically of very low solubility in the diluting medium, they are found to distribute onto the support and be active for polymerization. Very low solubilizing media such as mineral oil (e.g. Kaydo. or Drakol) or pentane is preferred. The diluent can be filtered off and the remaining solid shows polymerization capability much as would be expected if the catalyst had been prepared by traditional methods such as contacting the catalyst with methylalumoxane in toluene, contacting with the support, followed by removal of the solvent. If the diluent is volatile, such as pentane, it may be removed under vacuum or by nitrogen purge to afford an active catalyst. If more than one catalyst is used, one or more may be introduced to the support at the same time as the activator and others later added in a diluent to the preformed supported activator. If more than one catalyst is added to the pre-supported activator in diluent they may be added together or sequentially. Preferably, the mixing time is greater than 4 hours, but shorter times are suitable.

This above preferred method of supporting is advantageous when utilizing more than one catalyst on a support as interactions between the two or more catalyst species are minimized. Therefore, while traditionally supported catalyst interactions may be seen to lead to greater productivity by one catalyst relative to the other, or a reduced difference in density of the polymer populations produced by two catalysts with very different comonomer incorporation ratios, catalyst produced with a pre-supported activator in a diluent mitigate the deviations from expected catalyst behavior. Additionally, operability in a gas phase polymerization process is improved.

In one embodiment, the both the poor comonomer incorporating metallocene catalyst compound and the good comonomer incorporating catalyst compound are deposited on the same or separate supports together with an activator, or the activator may be used in an unsupported form, or may be deposited on a support different from the supported metallocene catalyst compounds of the invention, or any combination thereof.

The mole ratio of the metal or metalloid of the activator component to the metal of the supported metallocene catalyst compounds is in the range of between 0.3:1 to 1000:1, preferably 20:1 to 800:1, and most preferably 50:1 to 500:1. Where the activator is an ionizing activator such as those based on the anion tetrakis(pentafluorophenyl) boron, the mole ratio of the metal or metalloid of the activator component to the metal component of the metallocene catalyst is preferably in the range of between 0.3:1 to 3:1.

In one embodiment the catalyst system is used in an unsupported form, preferably in a liquid form such as described in U.S. Pat. Nos. 5,317,036 and 5,693,727 and European publication EP-A-0 593 083, all of which are herein incorporated by reference. The polymerization catalyst in liquid form can be fed to a reactor as described in PCT publication WO 97/46599, which is fully incorporated herein by reference.

Where an unsupported metallocene catalyst system is utilized, the mole ratio of the metal or metalloid of the activator component to the metal of the metallocene catalyst compound is in the range of between 0.3:1 to 10,000:1, preferably 100:1 to 5000:1, and most preferably 500:1 to 2000:1.

Polymerization Process

The catalysts and catalyst systems of the invention described above are suitable for use in any polymerization process over a wide range of temperatures and pressures. The temperatures may be in the range of from −60° C. to about 280° C., preferably from 50° C. to about 200° C. In one embodiment, the polymerization process is conducted above 70° C. and preferably above 80° C. The pressures employed may be in the range from 1 atmosphere to about 500 atmospheres or higher.

Polymerization processes include solution, gas phase, slurry phase and a high pressure process or a combination thereof. Particularly preferred are a gas phase or slurry phase polymerization process of one or more olefins at least one of which is ethylene.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1,4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbomadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using the particularly bridged bulky ligand metallocene-type catalysts as described in U.S. Pat. Nos. 5,296,434 and 5,278,264, both of which are herein incorporated by reference.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to about 110° C., and most preferably in the range of from about 70° C. to about 95° C.

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555, which are fully incorporated herein by reference.

A preferred process of the invention is where the process, preferably a slurry or gas phase process is operated in the presence of a bulky ligand metallocene-type catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. No. 5,712,352 and 5,763,543, which are herein fully incorporated by reference.

Polymer Product of the Invention

To produce the polymers of the invention, the poor comonomer incorporator and the good comonomer incorporator are selected such that the two catalyst produce at least two polymer populations having different densities and each comprising at least about 20 wt % of the polymer composition. The two catalyst must also be selected such that they have very different comonomer responses. FIG. 2, which is a plot of comonomer response curves for several catalysts in a gas phase process, illustrates, for example that $(Cp)IndZrCl_2$ and meso-$O(Me_2SiInd)_2ZrCl_2$ or $Me_2Si(H_4Ind)_2ZrCl_2$ and $(Me_5Cp)PrCpZrCl_2$ should provide the necessary separation of polymer population densities, while catalysts $(Cp)IndZrCl_2$ and $(Me_5Cp)PrCpZrCl_2$ or $(Cp)IndZrCl_2$ and $(Me_4Cp)_2ZrCl_2$ would not.

The polymers produced in the process of the invention can be used in a wide variety of products and end-use applications and include linear low density polyethylene, elastomers, plastomers, high density polyethylenes, low density polyethylenes, polypropylene and polypropylene copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc to about 0.930 g/cc.

The melt strength of the polymers produced using the catalyst of the invention are greater than 6 cN, preferably greater than 7 cN, and most preferably 8 cN or higher. For purposes of this patent application and appended claims melt strength is measured with an Instron capillary rheometer in conjunction with the Goettfert Rheotens melt strength apparatus. A polymer melt strand extruded from the capillary die is gripped between two counter-rotating wheels on the apparatus. The take-up speed is increased at a constant acceleration of 24 mm/sec$^2$, which is controlled by the Acceleration Programmer (Model 45917, at a setting of 12). The maximum pulling force (in the unit of cN) achieved before the strand breaks or starts to show draw-resonance is determined as the melt strength. The temperature of the rheometer is set at 190° C. The capillary die has a length of one inch (2.54 cm) and a diameter of 0.06" (0.15 cm). The polymer melt is extruded from the die at a speed of 3 inch/min (7.62 cm/min). The distance between the die exit and the wheel contact point should be 3.94 inches (100 mm).

The polymers produced by the process of the invention typically have a molecular weight distribution, a weight average molecular weight to number average molecular weight $(M_w/M_n)$ of greater than 1.5 to about 15, particularly greater than 2 to about 10, more preferably greater than about 2.5 to less than about 8, and most preferably from 3. to 8.

In one preferred embodiment, the polymers of the present invention have a $M_z/M_w$ of greater than or equal to 3, preferably greater than 3. $M_z$ is the z-average molecular weight. In another preferred embodiment, the polymers of the invention have a $M_z/M_w$ of greater than or equal to 3.0 to about 4. In yet another preferred embodiment, the $M_z/M_w$ is in the range greater than 3 to less than 4.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference.

The polymers of the invention in one embodiment have CDBI's generally in the range of greater than 50% to 100%, preferably 99%, preferably in the range of 55% to 85%, and more preferably 60% to 80%, even more preferably greater than 60%, still even more preferably greater than 65%. In another embodiment, the polymers have a CDBI less than 50%, more preferably less than 40%, and most preferably less than 30%.

The polymers of the present invention in one embodiment have a melt index (MI) or ($I_2$) as measured by ASTM-D-1238-E in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min.

The polymers of the invention in an embodiment have a melt index ratio ($I_{21}/I_2$) ($I_{21}$ is measured by ASTM-D-1238-F) of from 30 to less than 200, more preferably from about 35 to less than 100, and most preferably from 40 to 95.

The polymers of the invention in a preferred embodiment have a melt index ratio ($I_{21}/I_2$) ($I_{21}$ is measured by ASTM-D-1238-F) of from preferably greater than 30, more preferably greater than 35, even more preferably greater that 40, still even more preferably greater than 50 and most preferably greater than 65.

The polymers of the invention may be blended and/or coextruded with any other polymer. Non-limiting examples of other polymers include linear low density polyethylenes produced via conventional Ziegler-Natta and/or metallocene catalysis, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

The following examples are offered to provide a better understanding of the present invention, including representative advantages thereof.

EXAMPLES

Melt Index (MI) and Flow Index (FI) $I_2$ and $I_{21}$ were measured according to ASTM D-1238, Condition E and F respectively. Melt Index Ratio (MIR) is the ratio of $I_{21}$ over $I_2$. Density was measured according to ASTM D 1505.

Compositional distribution breadth index (CDBI) is defined as the weight percent of the copolymer molecules having a comonomer content within 50% of the median total molar comonomer content. The CDBI of linear polyethylene, which does not contain a comonomer, is defined to be 100%. The CDBI is calculated from data obtained from temperature rising elution fractionation (TREF) or from crystallization analysis fractionation (CRYSTAF) as is known in the art.

For purposes herein, Cp denotes a cyclopentadienyl ligand, $CpMe_5$ denotes a pentamethylcyclopentadienyl ligand, Ind denotes an indenyl ligand, and n-BuLi denotes n-butyl lithium.

Standard Schlenk/air sensitive techniques were used for the synthesis of metallocenes, their activation and supporting, and for handling of the supported catalysts. Dry, air-free solvents were used such as those sold commercially by Aldrich with the proviso that ethereal solvents were free of inhibitor.

The 1,3-Dichloro-1,1,3,3-tetramethyl disiloxane ($ClMe_2SiOSiMe_2Cl$) was purchased from Aldrich, Milwaukee, Wis., or from Gelest, Tullytown, Pa. $(CpMe_5)_2ZrCl_2$ was purchased from Strem Chemicals, Newburyport, Mass. $Cp_2ZrCl_2$ was purchased from Aldrich. $Ind_2ZrCl_2$, Dimethylsilylene bis(4,5,6,7 tetrahydroindenyl)$ZrCl_2$, Bis(1-methyl, 3-n-butylcyclpentadienyl)$ZrCl_2$, Dimethylsilylene bis (indenyl) $ZrCl_2$, Dimethylsilylene bis(2-methyl indenyl) $ZrCl_2$, and Ethylenebisindenylzirconium dichloride were purchased from Albemarle Corp., Baton Rouge, La. The methylalumoxane used was as a 30 wt % in toluene purchased from Albemarle, and was refrigerated when not in use.

$(CpMe_5)IndZrCl_2$ was prepared by reacting $(CpMe_5)ZrCl_3$ with indenyllithium in toluene followed by filtration, washing, and recrystallization from cold methylene chloride/pentane as is known in the art. $(Cp)IndZrCl_2$ was prepared according to the method disclosed in WO 98/28350.

Example 1

Conventional Supporting Technique

Supported catalysts were prepared by contacting the metallocenes or metallocenes in toluene with 30 wt % methylalumoxane in toluene (Albemarle, Baton Rouge, LA) for at least 10 minutes, followed by the addition of silica with thorough mixing, and removal of solvent under vacuum or nitrogen purge. The total solvent amount was such that the volume of liquids was equal to from about 1.1 to about 3 times the pore volume of the support. The conventionally supported catalysts were prepared such that the final supported catalyst slurried in the diluent would have loadings of about 12 wt % Al and 0.35 wt % Zr and an Al/Zr mole ratio of about 118.

Example 2A

Preparation of Catalyst System #Q1

$Me_2Si(H_4Ind)_2ZrCl_2$ and $(Me_5Cp)PrCpZrCl_2$ in as mole ratio of 19:1 was supported utilizing the technique of Example 1.

Example 2B

Polymerization Process Utilizing #Q1

Catalyst System #Q1 was run in a continuous gas phase fluidized bed reactor which comprised an 18 inch (45.7 cm) diameter, schedule 60 reactor having an internal diameter of 16.5 inches (41.9 cm). The fluidized bed, present in each such type reactor, is made up of polymer granules. The gaseous feed streams of ethylene and hydrogen together with liquid comonomer were mixed together in a mixing tee arrangement and introduced below the reactor bed into the recycle gas line. Hexene-1 was used as the comonomer. The individual flow rates of ethylene, hydrogen and comonomer were controlled to maintain fixed composition targets. The ethylene concentration was controlled to maintain a constant ethylene partial pressure. The hydrogen was controlled to maintain constant hydrogen to ethylene mole ratio. The concentration of all the gases was measured by an on-line gas chromatograph to ensure relatively constant composition in the recycle gas stream. The solid supported metallocene was injected directly into the fluidized bed using purified nitrogen at 1.5 lbs/hr (0.68 kg/hr). The reacting bed of growing polymer particles was maintained in a fluidized state by the continuous flow of the make up feed and recycle gas through the reaction zone. A superficial gas velocity of 1 to 3 ft/sec (30.5 cm/sec to 91.4 cm/sec) was used to achieve this. The reactor was operated at a total pressure of 300 psig (2069 kPa), a reactor temperature of 85° C. and a superficial gas velocity of 2.25 ft/sec (68.6 cm/sec) was used to achieve fluidization of the granules. To maintain a constant reactor temperature, the temperature of the recycle gas is continuously adjusted up or down to accommodate any changes in the rate of heat generation due to the polymerization. The fluidized bed was maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small stream of humidified nitrogen to deactivate any trace quantities of residual catalyst.

Example 2C

Polymer Produced by #Q1

Figure 3:
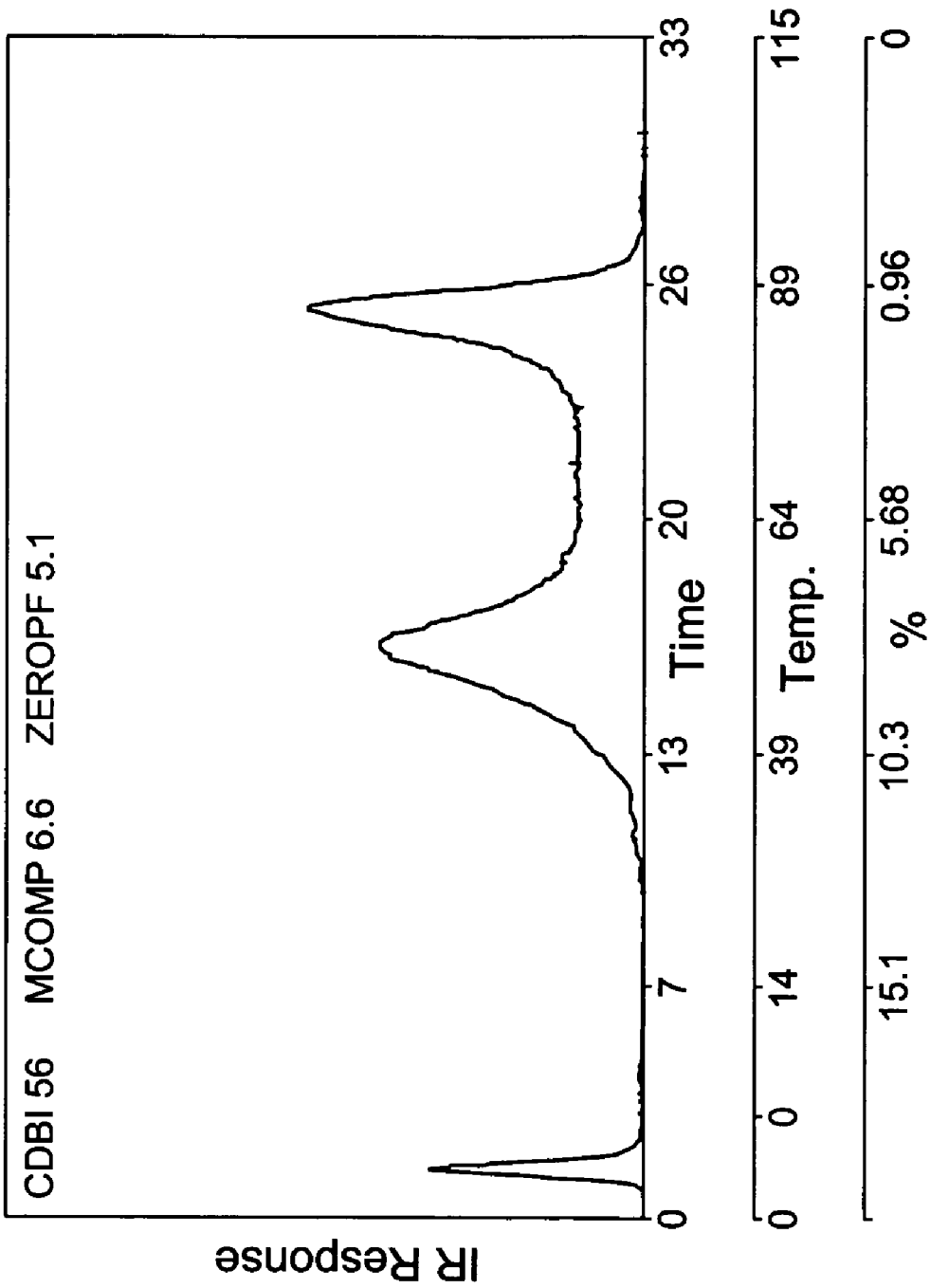
FIG. 3 is a TREF plot of the polymer of Example 2C
Figure 4A:
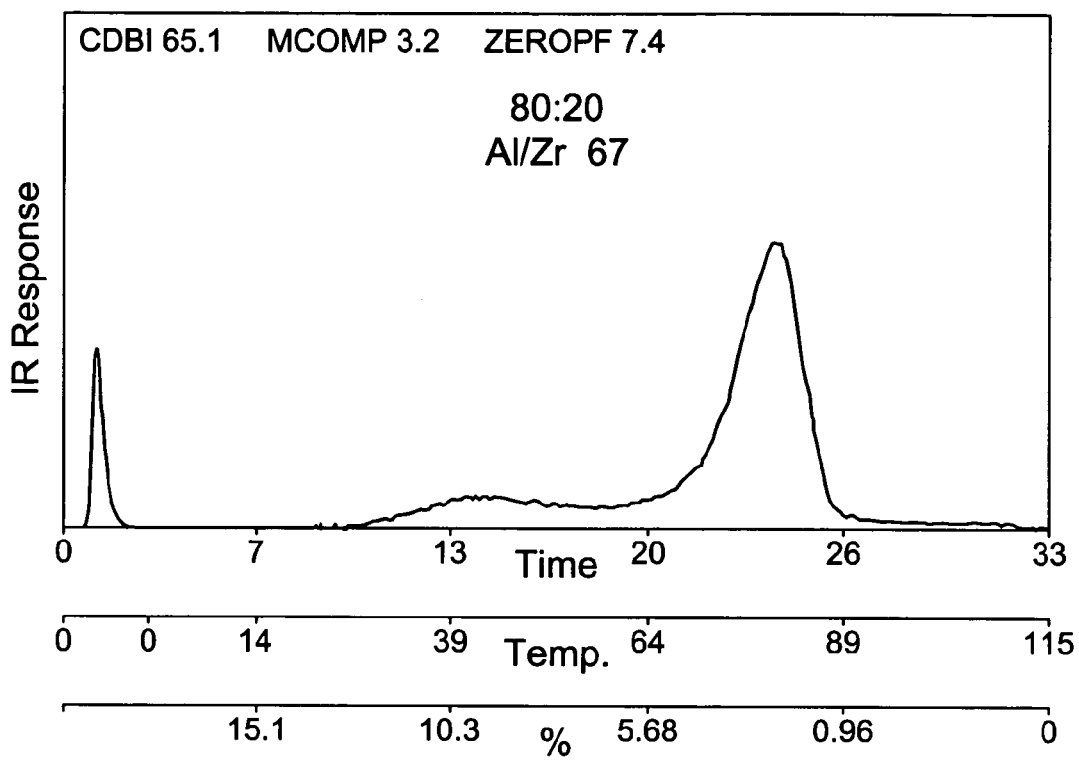
FIGS. 4A–4D are TREF plots of the polymers of Example 3C
Figure 4B:
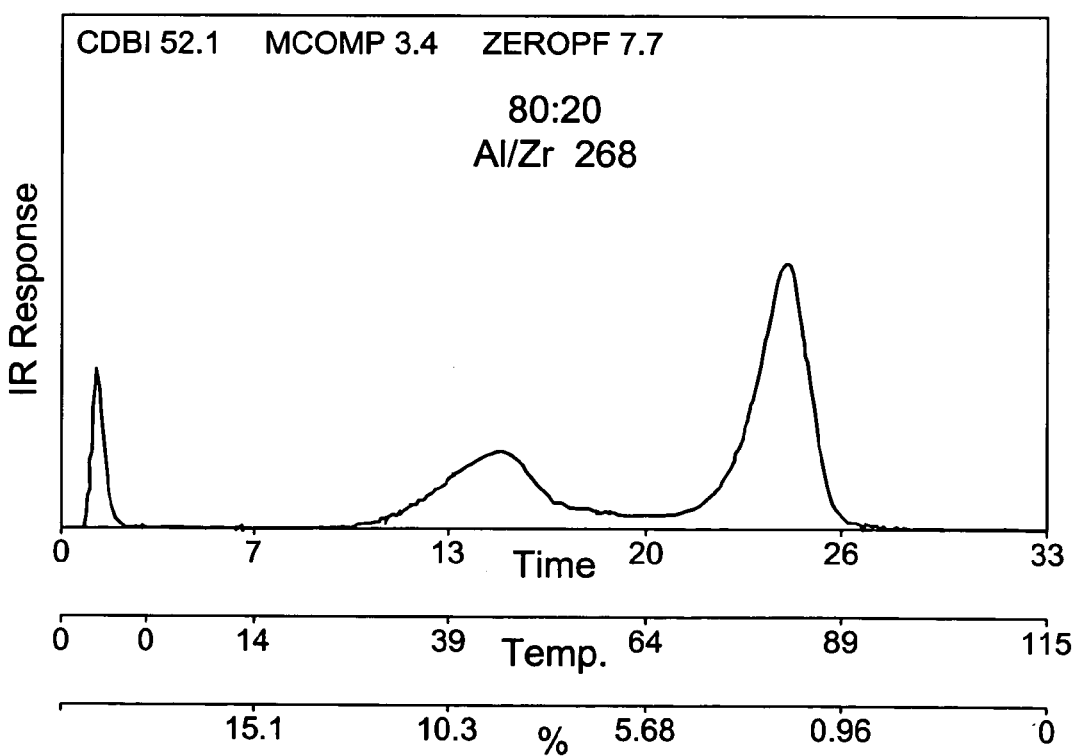
Figure 4C:
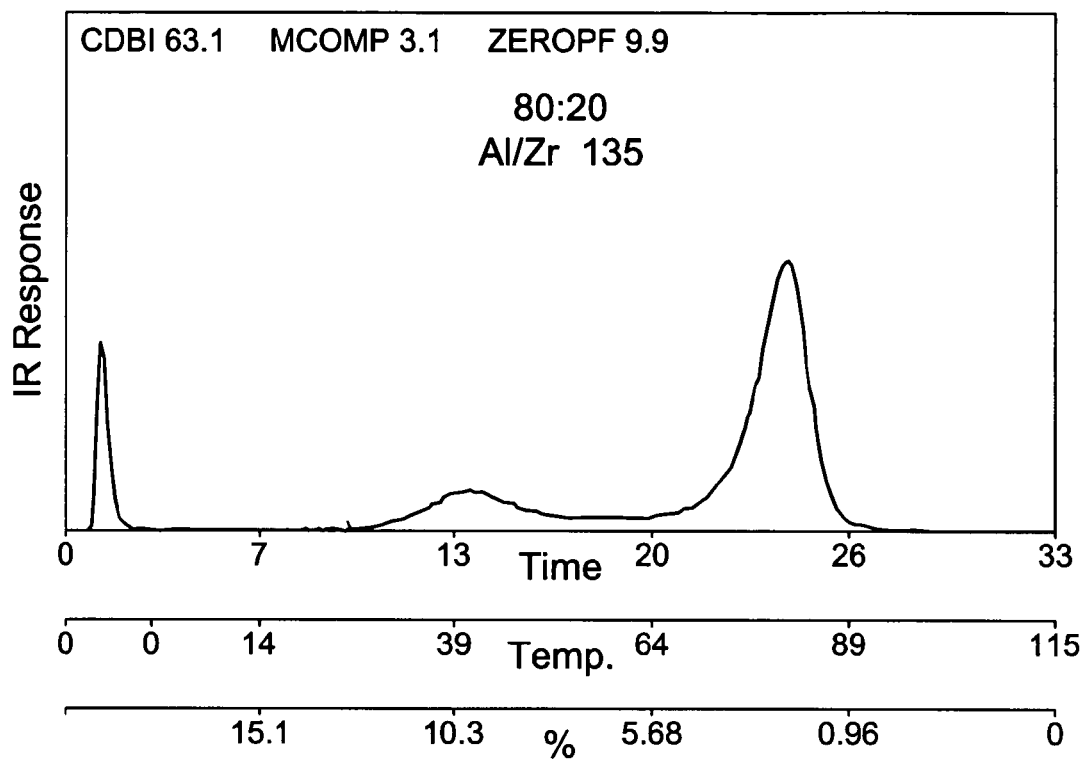
Figure 4D:
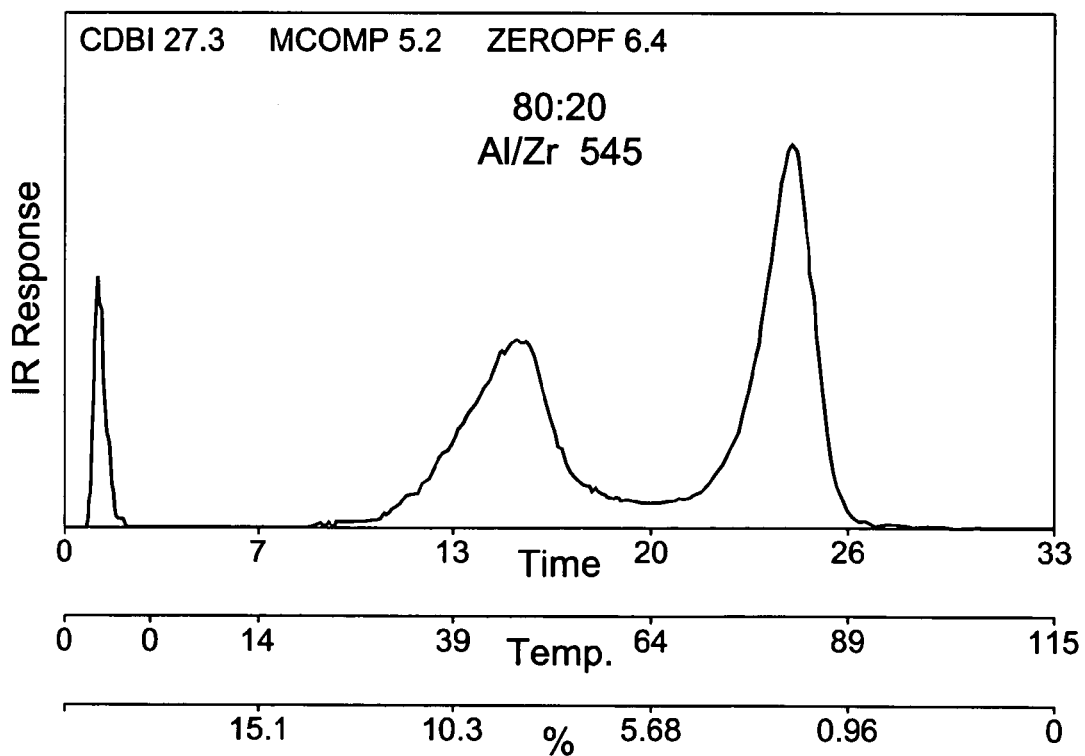

A polymer of 0.912 g/cc density and 3.3 MI exhibited a well separated bimodal composition distribution (FIG. 3) with similar wt % of each polymer component. While the individual catalyst components exhibit similar activity making about 0.918 g/cc density and 1 MI product, this experiment demonstrates a strong increase in productivity for the poor incorporator $(Me_5Cp)PrCpZrCl_2$ relative to the good incorporator $Me_2Si(H_4Ind)_2ZrCl_2$ Example 3A Preparation of Catalyst System #Q2

The catalyst system of Example 2A was utilized except that the mole ratio of $Me_2Si(H_4Ind)_2ZrCl_2$ to $(Me_5Cp)PrCpZrCl_2$ was 4:1. In addition, four different Al/Zr mole ratios of 67:1, 135:1, 268:1, and 545:1 were prepared.

Example 3B

Polymerization Process Utilizing #Q2

Polymerizations were conducted in a stainless steel, 1-liter Zipperclave autoclave reactor. The reactor was equipped with water jacket for heating and cooling. Injections were typically done through a septum inlet or were injected via a high pressure nitrogen injection. Before polymerization the reactor was purged with nitrogen for several hours at 100° C. Upon injection of catalyst, ethylene was fed continuously on demand keeping the reactor pressure constant while maintaining the reaction temperature at 60° C. The reaction was stopped by cooling and venting the pressure and exposing the contents of the reactor to air. The liquid components were evaporated and the poly(ethylene-co-hexene-1) was dried in a vacuum oven.

Example 3C

Polymer Produced by #Q2

TREF analysis of the polymers, FIGS. 4A–4D, illustrate that as the Al/Zr mole ratio increased, the contribution of the better comonomer incorporator also increased. Therefore, while the catalysts (i.e., the transition metal compounds) which had different comonomer incorporation characteristics were present in the same mole ratio in all four runs, their relative contributions to the total resultant polymer mass became more equal as the Al/Zr mole ratio increased. While not wanting to be held to any particular theory, one possible explanation for this phenomena is the transition metal catalyst compounds have different equilibrium constants for activation. With this discovery, to control relative contributions to the total resultant polymer mass, catalyst compounds may be supported separately and fed into the polymerization reactor separately or fed as a mixture of separately supported systems.

Example 4

Deposition of Catalyst in Oil, Hydrocarbon, or Non-Solvent Supporting Technique

Supported catalysts were prepared by a dipping method. That is, the supported catalyst systems were prepared by contacting (mixing) dry-powdered transition metal compounds with pre-supported methylalumoxane slurried in a diluent such that the final supported catalyst system had a loading of about 12 wt % Al and 0.35 wt % Zr and a Al/Zr mole ratio of about 118:1. The pre-supported methylalumoxane was made using 30 wt % MAO in toluene (Albemarle) and Davison 948 or 955 silica. The methylalumoxane was contacted with silica slurried in toluene and the solvent was removed yielding free-flowing powder. For the catalyst pair $(Cp)IndZrCl_2$ and meso-$O(Me_2SiInd)_2ZrCl_2$, the catalyst may be deposited on the support sequentially or concurrently without disadvantage.

Example 5A

Preparation of Catalyst System #Z $(Cp)IndZrCl_2$ and meso-$O(Me_2SiInd)_2ZrCl_2$, in a 1:3 mole ratio was supported utilizing the technique of Example 4 as about a 17 wt % slurry in Kaydol (Witco).

Example 5B

Polymerization Utilizing Catalyst System #Z

Figure 5A:
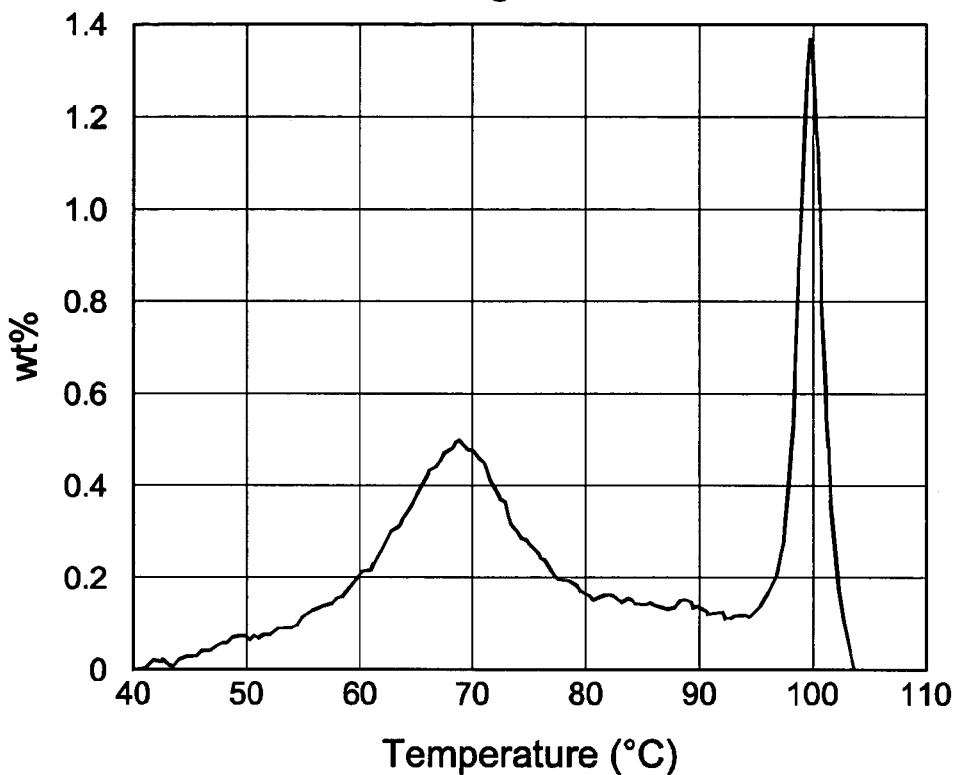
FIG. 5A is a TREF plot of the polymer of Example 5C
Figure 5B:
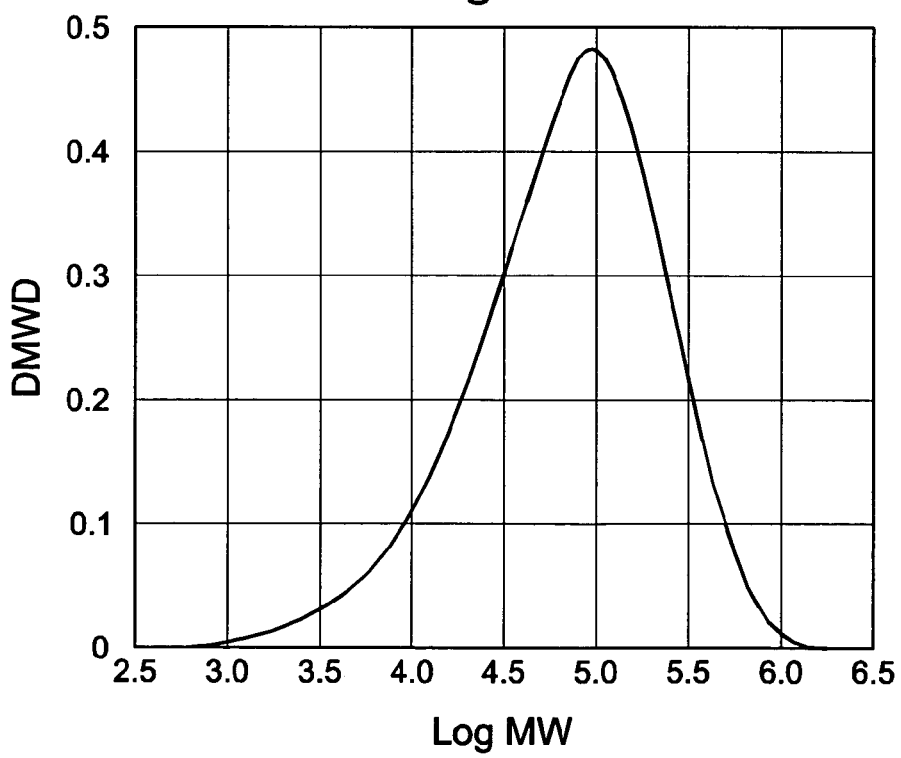
FIG. 5B is a MWD plot of the polymer of Example 5C

Catalyst System #Z was run in a continuous gas phase fluidized bed reactor as described in Example 2B Example 5C Polymer Produced by #Z Film blown from the resin of about 1 MI and about 0.918 to 0.921 g/cc density (Table 3) exhibited superior tear, modulus, and puncture properties compared to similar commercial metallocene resin (Comparative 1 of Table 3) and commercial Ziegler-Natta resin (Comparative 2 of Table 3)

known for improved tear and dart properties. Typical compositions for the resins as determined by TREF, FIG. 5A, indicate very bimodal compositions with well separated polymer populations assignable to the poor and good comonomer incorporating catalysts. Each component typically contributes at least 30 wt % for products of about 0.920 g/cc density and separation of the peaks in the TREF of the maxima are greater than 20° C. The molecular weight distributions were about 3.5 to 4.5, FIG. 5B, somewhat broader than either of the catalysts alone.

TABLE 1

Data Points utilized in Comonomer Mole Ratio vs. Density Graph (FIG. 2)

| Catalyst Ligand Set | C6/C2 | Gradient Density | MI | MFR | H2 ppm/ % C2 |
|---|---|---|---|---|---|
| $(Me_4Cp)_2$ | 0.022 | 0.927 | 2.8 | 20.6 | 1.8 |
| $(Me_4Cp)_2$ | 0.018 | 0.934 | 3.7 | 19.6 | 2.1 |
| $(Me_4Cp)_2$ | 0.027 | 0.922 | 2.4 | 23 | 1.6 |
| $(Me5Cp)_2$ | 0.048 | 0.934 | 1.23 | — | 0.7 |
| meso-$O(Me2SiInd)_2$ | 0.024 | 0.942 | 0.89 | 27.5 | 2.2 |
| meso-$O(Me2SiInd)_2$ | 0.040 | 0.937 | 1.34 | 35.8 | 2.6 |
| meso-$O(Me2SiInd)_2$ | 0.044 | 0.937 | 1.4 | 25.8 | 3.0 |
| meso-$O(Me2SiInd)_2$ | 0.056 | 0.934 | 1.17 | 27.5 | 2.1 |
| rac-$O(Me2SiInd)_2$ | 0.046 | 0.924 | 1.3 | 30.1 | 0.5 |
| rac-$O(Me2SiInd)_2$ | 0.051 | 0.924 | 5.23 | 34.4 | 0.7 |
| Cp(Ind) | 0.021 | 0.905 | 1.79 | 19.4 | 5.8 |
| Cp(Ind) | 0.026 | 0.900 | 1.31 | 21.4 | 4.8 |
| Cp(Ind) | 0.020 | 0.907 | 1.1 | 21 | 7.6 |
| Cp(Ind) | 0.000 | 0.961 | 23.8 | 17.2 | 5.7 |
| Cp(Ind) | 0.011 | 0.929 | 23.2 | 19.4 | 10.0 |
| Cp(Ind) | 0.014 | 0.917 | 1.32 | 19.4 | 2.9 |
| Cp2 | 0.019 | 0.917 | 0.48 | 59 | 6.1 |
| (Me5Cp)Ind | 0.021 | 0.924 | 1.43 | 15.7 | 1.1 |
| (Me5Cp)Ind | 0.006 | 0.939 | 0.39 | 19 | 0.7 |
| (Me5Cp)Ind | 0.006 | 0.950 | 24.85 | 18.5 | 4.8 |
| (Me5Cp)Ind | 0.020 | 0.935 | 35.03 | 18.2 | 4.9 |
| (Me5Cp)Ind | 0.036 | 0.920 | 1.18 | 17.45 | 0.7 |
| (Me5Cp)Cp | 0.028 | 0.923 | 1.22 | 34 | 6.5 |
| $(Ind)_2$ | 0.019 | 0.918 | 3.74 | 16.91 | 2.6 |
| $(Ind)_2$ | 0.019 | 0.922 | 83.23 | 26.62 | 11.6 |
| $(Ind)_2$ | 0.011 | 0.935 | 111.52 | 10.21 | 11.2 |
| $(Ind)_2$ | 0.013 | 0.926 | 3.56 | 17.23 | 1.9 |
| $Me2Si(H4Ind)_2$ | 0.000 | 0.964 | 7.95 | 0 | 7.3 |
| $Me2Si(H4Ind)_2$ | 0.000 | 0.960 | 2.86 | 29.8 | 3.7 |
| $Me2Si(H4Ind)_2$ | 0.000 | 0.959 | 1.51 | 0 | 4.8 |
| $Me2Si(H4Ind)_2$ | 0.000 | 0.958 | 1.302 | 27.3 | 3.8 |
| $Me2Si(H4Ind)_2$ | 0.000 | 0.955 | 1.117 | 32.4 | 3.0 |
| $Me2Si(H4Ind)_2$ | 0.000 | 0.951 | 0.71 | 0 | 6.4 |
| $Me2Si(H4Ind)_2$ | 0.000 | 0.949 | n/a | ? | 1.4 |
| $Me2Si(H4Ind)_2$ | 0.005 | 0.929 | 1.852 | 35.2 | 9.4 |
| $Me2Si(H4Ind)_2$ | 0.006 | 0.923 | 1.64 | 33.4 | 9.7 |
| $Me2Si(H4Ind)_2$ | 0.007 | 0.917 | 0.34 | 59.3 | 7.4 |
| $Me2Si(H4Ind)_2$ | 0.007 | 0.917 | 0.67 | 47.5 | 9.0 |
| $Me2Si(H4Ind)_2$ | 0.008 | 0.914 | 0.44 | 51.5 | 7.5 |
| $Me2Si(H4Ind)_2$ | 0.010 | 0.914 | 1.29 | 39.4 | 11.3 |
| $Me2Si(H4Ind)_2$ | 0.010 | 0.910 | 1.24 | 41.7 | 10.4 |
| $CH2CH2(Ind)_2$ | 0.013 | 0.918 | 1.95 | 45.20 | 11.8 |
| $Me2Si(Ind)_2$ | 0.008 | 0.922 | 0.91 | 85.97 | 43.1 |
| $Me2Si(2\text{-}MeInd)_2$ | 0.006 | 0.916 | 1.48 | 57.78 | 40.8 |
| $Me2Si(2\text{-}MeInd)_2$ | 0.007 | 0.918 | 0.75 | 78.50 | 34.1 |
| $Me2Si(2\text{-}MeInd)_2$ | 0.007 | 0.917 | 0.14 | 107.00 | 20.0 |

TABLE 2

Polynomial Equations Used to Fit Comonomer Response Data (FIG. 2)

| Catalyst | Equation | Set Intercept to |
|---|---|---|
| $(Me_4Cp)2\ ZrCl2$ | $y = 6.8031x^2 - 1.6044x + 0.96$ | 0.96 |
| $Me_2Si(H_4Ind)2ZrCl2$ | $y = 300.75x^2 - 7.5505x + 0.9566$ | not set |
| Cp(Ind) ZrCl2 | $y = 52.58x^2 - 3.7679x + 0.9615$ | not set |
| $(Ind)2\ ZrCl2$ | $y = 40.974x^2 - 2.9269x + 0.96$ | 0.96 |
| $(Me5Cp)Ind\ ZrCl2$ | $y = 14.318x^2 - 1.4146x + 0.9523$ | not set |
| meso-$O(Me2SiInd)2\ ZrCl2$ | $y = 7.8436x^2 - 0.8913x + 0.96$ | 0.96 |

TABLE 3[1]

Polymer Data of Catalyst #Z and Comparatives 1 and 2 of Example 5C

| | Catalyst Z | Comparative 1 | Comparative 2 |
|---|---|---|---|
| MI | 0.82 | 1.14 | 1.01 |
| MIR | 21 | 16 | 26 |
| Density | 0.9206 | 0.9195 | 0.9177 |
| 1% Secant Modulus MD (psi) | 38500 | 31600 | 27100 |
| 1% Secant Modulus TD (psi) | 44400 | 33000 | 34900 |
| Dart Impact (g/mil) | 600 | 690 | 190 |
| MD Tear (g/mil) | 360 | 230 | 380 |
| TD Tear (g/mil) | 600 | 420 | 720 |
| Tensile Strength (psi) | 11000 | 10200 | 9300 |
| Tensile Strength (psi) | 8600 | 7400 | 7500 |
| Puncture Force (lb/mil) | 11 | 10 | 10 |
| Puncture Engery (lb/mil) | 37 | 31 | 35 |
| Haze (%) | 16 | 38 | 10 |
| Gloss | 63 | 25 | 65 |

[1] 2.5" Gloucester Blown Film Line 0.75 mil Film, 2.5 BUR, 10 lb/h/in

We claim:

1. A process for polymerizing olefin(s) to produce a polymer product, the process comprising contacting ethylene and at least one comonomer with a catalyst system, wherein the catalyst system comprises a poor comonomer incorporating catalyst compound comprising a metallocene structure comprising at least one fused ring cyclopentadienyl ligand bridged to another cyclopentadienyl ligand, where the bridge is a long bridge defined as a bridge containing an Si-O-Si group, and a good comonomer incorporating catalyst compound; wherein the poor incorporator metallocene is a polymerization catalyst which when run under process conditions wherein $(Ind)_2ZrCl_2$ would produce a 0.920 g/cm$^3$ density polyethylene, produces a polymer with a density greater than 0.920 g/cm$^3$; further comprising isolating a polymer product having a density of from 0.910 to 0.940 g/cm$^3$, an Mw/Mn value of from 2 to less than 10 and an $I_2$ value of from 0.1 to 100 dg/min.

2. The process of claim 1, wherein the poor comonomer incorporating catalyst compound comprises at least one fused ring cyclopentadienyl based ligand directed to the front of the molecule by an angle α which is greater than 30 degrees.

3. The process of claim 2, wherein α is greater than 60°.

4. The process of claim 2, wherein the poor comonomer incorporating catalyst compound comprises two fused ring cyclopentadienyl based ligands, wherein the angle α of one of the two ligands is about 70° to about 90° and wherein angle α of the second of the two ligands is greater than 15°.

5. The process of claim 4, wherein the angle α of one of the two ligands is about 70° to about 90° and wherein angle α of the second of the two ligands is greater than 45°.

6. The process of claim 1, wherein the polymer product is formed into a film.

7. The process of claim 1, wherein the process is a gas phase process.

8. The process of claim 1, wherein the poor comonomer incorporating catalyst compound requires a comonomer to monomer mole ratio at least two times that of the good comonomer incorporating catalyst compound to prepare the same density polymer.

9. The process of claim 8, wherein the poor comonomer incorporating catalyst compound requires a comonomer to monomer mole ratio of at least three times that of the good comonomer incorporating catalyst compound.

10. The process of claims 8 or 9, wherein the density of the polymer is 0.920 g/cm$^3$.

11. The process of claim 1, wherein the at least one comonomer is selected from alpha-olefins having from 4 to 15 carbon atoms.

12. The process of claim 11, wherein the polymer product possesses a CDBI of from 55% to 85%.

* * * * *